May 17, 1960 R. J. BRAUND 2,936,615
TEAR DETECTOR
Filed Oct. 26, 1956 2 Sheets-Sheet 1
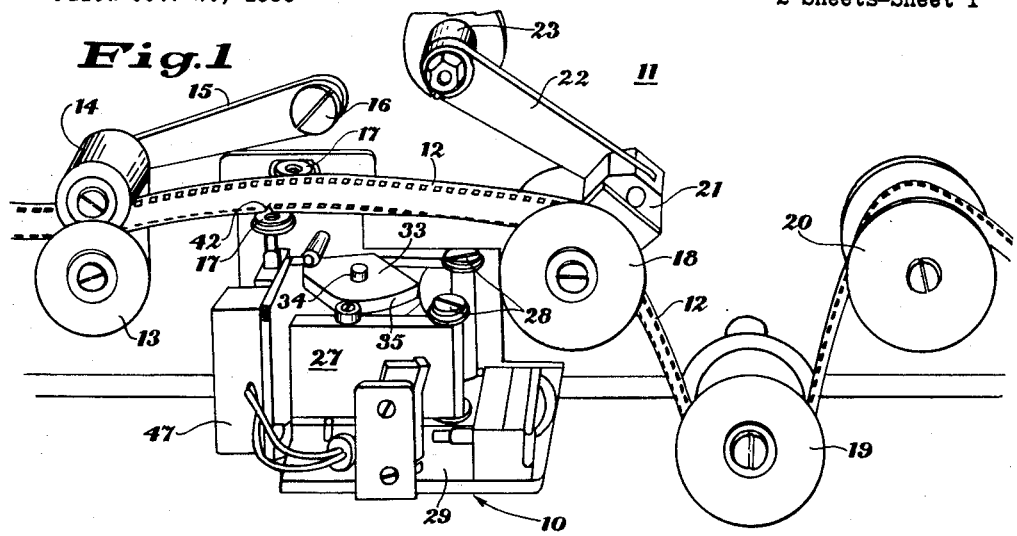
Fig.1
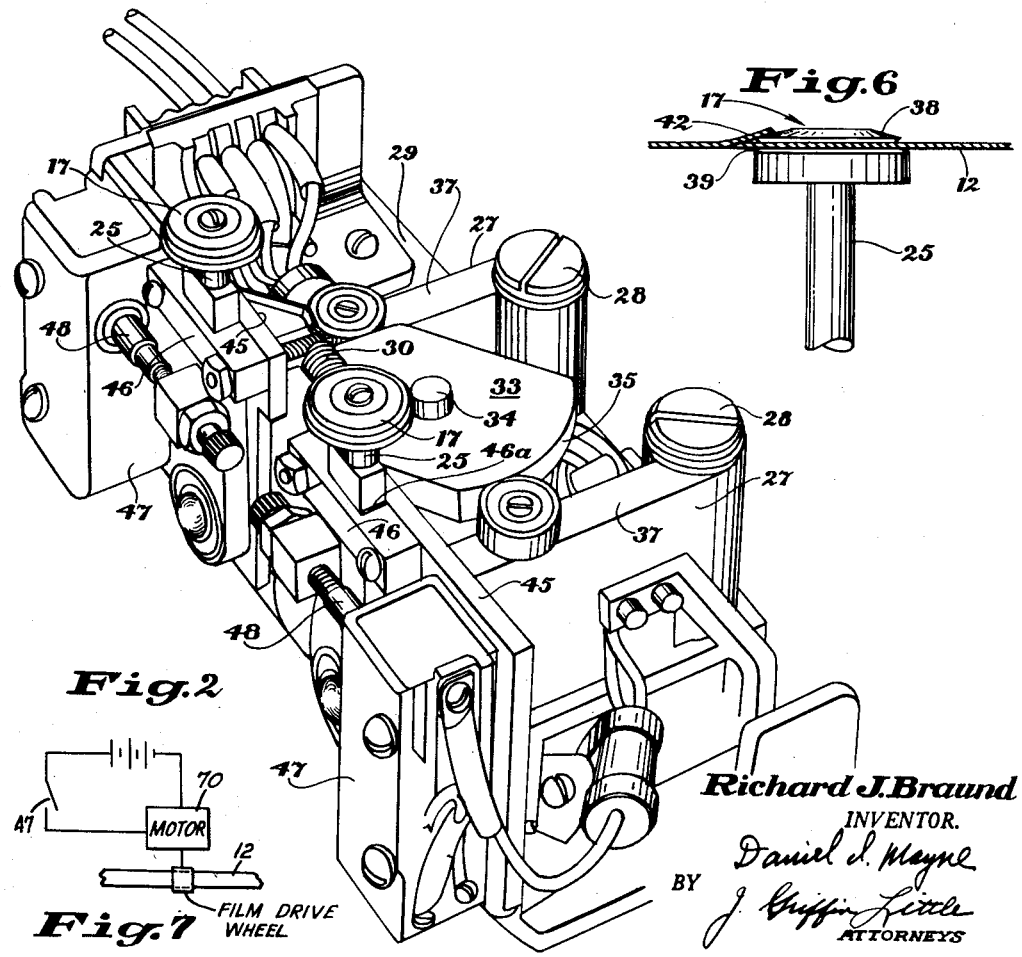
Fig.2
Fig.6
Fig.7 FILM DRIVE WHEEL
Richard J. Braund
INVENTOR.
BY Daniel S. Mayne
J. Griffin Little
ATTORNEYS May 17, 1960  R. J. BRAUND  2,936,615
TEAR DETECTOR
Filed Oct. 26, 1956  2 Sheets-Sheet 2

Richard J. Braund
INVENTOR.

BY Daniel I. Mayne
J. Griffin Little
ATTORNEYS

United States Patent Office 2,936,615
Patented May 17, 1960

2,936,615
TEAR DETECTOR

Richard J. Braund, Washington, D.C., assignor to Eastman Kodak Company, Rochester, N.Y., a corporation of New Jersey Application October 26, 1956, Serial No. 618,645

13 Claims. (Cl. 73—157)

The present invention relates to a tear detecting device, and more particularly to a device for detecting imperfections in the edge portion of motion picture films.

The device of the present invention is concerned with a mechanical device that will detect film edge irregularities or imperfections such as small edge tears (.030" deep), synthetic tape splices, patch splices, creased film, torn perforations, film ends, etc. The device is capable of scanning film at a very high speed (1000 feet per minute) and will detect these film defects and flaws or imperfections with a remarkable degree of accuracy. The device may be used in connection with film processing machines, splicing machines, detecting machines or any similar device in which a continuously moving film or web is being moved.

The device of the present invention is particularly advantageous in connection with machines in which a long length of web is threaded, such, for example, as film processing machines. The film is inspected for defects before entering such machines, because if a film with defects is allowed to enter, the film may break at the point of such defect with the result that several hundred feet of film may be destroyed and a great deal of time will be lost in rethreading the machine.

The most universely accepted manner of scanning film has been to allow the operator to feel the film edges, flexing the film between the thumb and fingers. Other devices have also been employed, such as scanning the film edges with a Carboloy needle or by putting a yoke down over the film so the yoke will be kicked out by small tears. However, these devices have been unsatisfactory primarily because they easily come out of adjustment, and also because additional aids have to be employed to detect such things as torn perforations and broken ends.

In order to overcome these disadvantages, the present invention provides two grooved members or wheels between which the moving web passes. These grooved wheels engage the opposite edges of the moving web and are spaced apart a distance slightly less than the width of the web so as to impart a transverse flexing or buckling to the web to tension the latter laterally. When a film defect or imperfection is moved into registry with one of the wheels, means on the wheels cams the associated film edge out of contact with the wheels to remove the support thereof. The wheels are then moved toward each other to a point at which the wheels are moved closer together than when in film supporting position. The movement of the wheels, upon disengagement from the film, serves to actuate a switch or switches, which may control a drive motor or brake, or operate a visual or audible signal so as to notify the operator of the presence of a defect so that the necessary steps may be taken, as is deemed apparent.

The present invention has as its principal object the provision of a new and improved edge tear detector device.

A further object of the invention is the provision of a detector which is automatic in its operation, and accurately detects defects in a web moving at high speed.

A still further object of the invention is the provision of a detector which is simple, rugged and effective.

To these and other ends the invention resides in certain improvements and combinations of parts, all as will be hereinafter more fully described, the novel features being pointed out in the claims at the end of the specification.

In the drawings:

Fig. 1 is a front perspective view of the tear detector device of the present invention, showing the relation of the film web or strip and the various associated rollers;

Fig. 2 is a perspective view of the device of the present invention, but on a larger scale than Fig. 1, showing the relation of the different parts;

Fig. 6 is a vertical view taken substantially on line 6—6 of Fig. 5, showing the operation of the guide wheel when a tear or defect moves into registry therewith; and Fig. 7 is a simple wiring diagram, showing one form of indicating device.

Similar reference numerals throughout the various views indicate the same parts.

Figure 3:
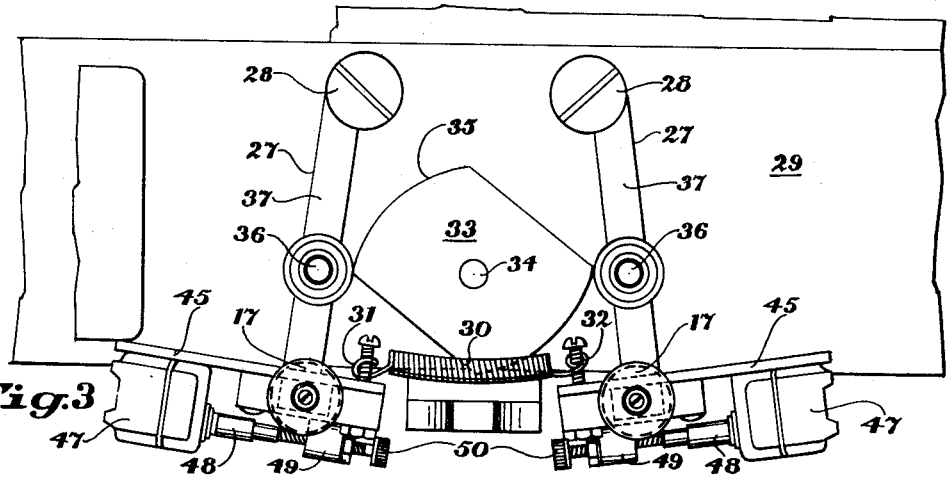
Fig. 3 is a plan view of the detector illustrated in Figs. 1 and 2 showing the parts in open position for loading.

As mentioned above, the tear detector of the present invention is adapted for use in connection with film processing, splicing, or detecting machines, or similar devices, in which it is desirable to scan a moving web or film to detect marginal tears, defects, or imperfections.

The tear detector is indicated broadly by the numeral 10, Fig. 1, and is shown in relation to wall 11 of the machine with which it is used. The film strip or web 12 is fed from a point of supply to the detector, and is passed over a guide roll 13 which is suitably mounted for rotation on the wall 11 of the machine. The film 12 is held against the guide roll 13 by a pressure roll 14 which presses on the film, as shown in Fig. 1. The roll 14 is carried on the free end of a cantilever arm 15, the other end of which is rockably mounted at 16 on the wall 11. From the rollers 13 and 14, the film or web passes between a pair of film guide rollers or wheels 17 of the tear detector 10 and then passes over a series of guide rolls 18, 19 and 20. The film is held against the roll 18 by a pressure roll 21 carried on the end of an arm 22 which is rockably mounted at 23 on the wall 11. In passing over the guide wheels 17 any edge defect or imperfection will be detected, as will be later more fully described.

The film 12 to be scanned is passed between the wheels 17 which are rotatably mounted and supported on the upper ends of arms or posts 25 which are pivotally mounted at 26 on the left ends, Fig. 1, of a pair of connector arms 27 each of which is rockably mounted on a stud 28 which extends upwardly from a base plate 29. Thus, the wheels 17 have three movements—(1) rotation of the wheels on posts 25; (2) movement toward and away from each other as a unit with posts 25 about pivots 26; and (3) movement as a unit with pivots 26 and arms 27 about studs 28, all as is deemed apparent from an inspection of the drawings. A coil spring 30 has the opposite ends 31 and 32 connected to plates 45, to be later described, and tends to move the posts 25 and arms 27 toward each other to the position illustrated in Fig. 5, the purpose of which arrangement will be later pointed out.

When the detector 10 is to be loaded, the wheels 17, posts 25 and arms 27 are moved to the position shown in Fig. 3, against the action of spring 30, as is deemed apparent from an inspection of Fig. 3. In this position, the wheels 17 are spaced a distance greater than the width of the film 12. The movement of the parts to the position illustrated in Fig. 3 may be performed manually or electrically. In the present embodiment an actuating member 33 is carried by stud 34 on the base 29 and has curved end portions or cam areas 35 which, when the member 33 is rotated about stud 34, engage rollers 36 on the top edge 37 of arms 27. Upon engagement of the areas 35 with the rolls 36, the right arm 27, Fig. 3, is rocked counterclockwise about its pivot 28 and the left arm 27 is rocked clockwise about its stud 28 to shift the posts 25 and the roller or wheels 17 away from each other to the loading or open position shown in Fig. 3. Such movement serves to elongate or tension coil spring 30. As is deemed apparent from an inspection of Fig. 3, the wheels 17 are now spaced a distance greater than the width of the film 12. The latter is now threaded over the various rollers and between the detecting wheels 17.

Figure 4:
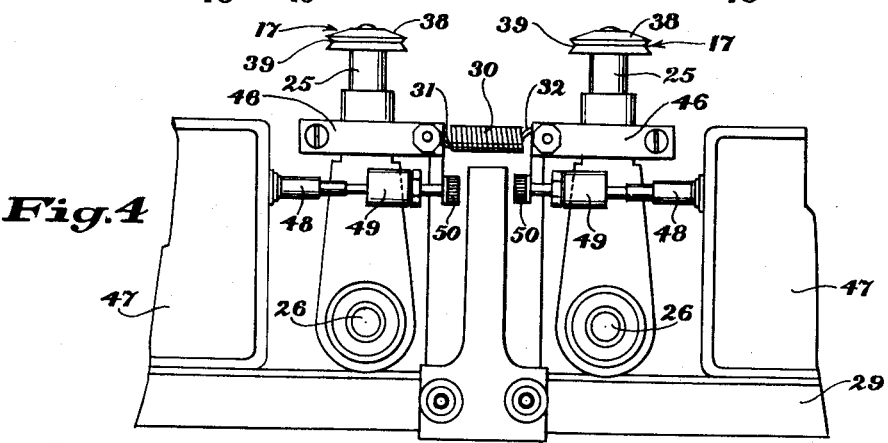
Fig. 4 is a left end view of the detector illustrated in Fig. 1 but showing the film guide wheels in released or non-operating relation.
Figure 5:
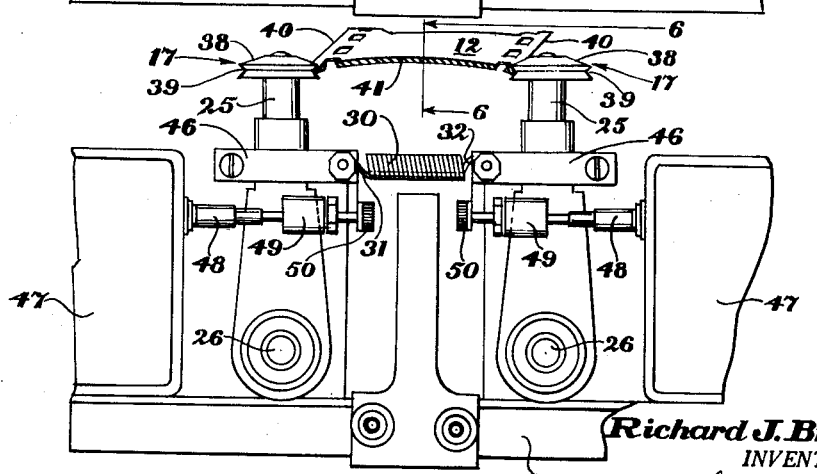
Fig. 5 is a view similar to Fig. 4 but with the film guides or wheels in film supporting relation.

As shown in Figs. 4 and 5, the detector wheels are in horizontal alignment and each wheel has a curved or bowed top 38, the purpose of which arrangement will be later more fully described. In addition, each wheel 17 has a perpihery thereof formed with a V-shaped notch or groove 39 adapted to receive an edge 40 of the film strip, as shown in Fig. 5. After the film strip 12 has been threaded, the member 33 is rocked in the opposite direction and the arms 27, posts 25 and wheels 17 are moved toward each other, under the action of the tensioned spring 30 until the film edges are received in the notches 39, as illustrated in Fig. 5. The force of the spring 30 is such as to move the wheels 17 to a point at which the wheels are spaced a distance apart which is slightly less than the width of the film 12. In this position the wheels 17 impart a slight bow or deflection 41 to the portion of the film between wheels 17, as shown in Fig. 5. Thus, a slight transverse bow or flexing of the film imparts a lateral tension to the film between the wheels 17, as is deemed apparent.

As the film strip moves through the detector, the wheels 17 will be held in yieldable contact with the film edges 40 by reason of the slight tension of the spring 30. The film edges 40 will continue to move and be positioned in grooves 39 of the wheels 17 as long as there are no edge defects or imperfections in the film strip. However, as soon as the edge defect is moved into registry with one of the wheels 17, due to the bowed relation of the film, the defective or torn area will lie above the adjacent film as shown at 42 in Fig. 6. In other words, the portion of the film strip which is just behind or on the trailing side of the defective area will not be under the bowing influence of the notches 39 of the wheels 17 and the result is that the area 42 will lie slightly above adjacent film area and above the film in notches 39. Because of this arrangement, movement of the film will cause the area 42 to ride or climb up on the curved top 38 of the adjacent wheel 17 and will cam the edge 40 out of the associated grooves 39 of the wheels 17. As the edge 40 is moved out of the notch 39, the film edge is disconnected from the associated wheels 17 and the wheels are no longer held in a definite spaced relation by the film 12, but are free. Means, to be later described, then serves to move the wheels 17 and the supporting posts 25 a slight distance inward to the position shown in Fig. 4, in which the rollers or wheels 17 are spaced a distance apart which is slightly less than that shown in Fig. 5 and less than the width of the film strip. Thus, the film edge is moved freely through the notches 39 of the wheels 17 so long as the film edges are in proper condition. However, when an edge defect moves into registry with either wheel 17, the wheels are automatically and completely disconnected from the film strip and move toward each other to the position shown in Fig. 5. Therefore, when the wheels 17 are disconnected the operator is visually notified of the presence of an edge defect. However, as the film is moving rapidly past the wheels 17, it may require some time after stopping of the machine to locate the exact point of defect. In order to overcome this difficulty, the present invention provides means which is operative upon inward movement of the wheels 17 to bring the film strip to a stop.

To secure this result, each arm 27 has mounted thereon a laterally extending plate 45 which may, if desired, also have mounted thereon guide plates 46 each of which is formed with a slot 46a, through which the upper end of the associated post 25 extends to provide a guide for the latter. In addition, each plate 45 has mounted thereon a microswitch 47 having a spring actuated operating plunger 48 which extends toward the associated or adjacent posts 25, as best illustrated in Figs. 4 and 5. The slots 46a in posts 46 serve to limit the lateral movement of the posts 25 relative to the arm 27. When arms 27 are in the inner position, Fig. 5, the wheels 17 are spaced a distance slightly less than the width of the film to bow the latter as above described. However, when a defect moves into registry with the wheels 17 and the latter are freed, posts 25 are moved toward each other further to the position shown in Fig. 4, to decrease further the spacing of the wheels. If desirable, the ends of springs 30 may be anchored either directly to the plates 46 or plates 45, the latter being shown in the drawings. Each post 25 is formed with a lug 49 in which is threadably mounted a screw 50 positioned in alignment with and adapted to engage and move the plunger 48 to operate the adjacent microswitch 47.

When the posts 25 are in film engaging position, Fig. 5, each member 50 presses against the spring actuated plunger 48 of the adjacent switch 47. However, when the film is disconnected from the wheels, the spring pressed plunger 48 acts on the members 50 to rock the posts 25 about their pivots 26 to move the wheels 17 closer together to the position shown in Fig. 4. This movement of the plunger also serves to actuate the switches 47. The latter may be either the normal open type or closed type switch. If of the normal closed type, the inward movement of the wheels 17 may be utilized to open these switches to stop the drive motor 70 of the machine. In addition, these switches may be utilized to control various signalling devices, brakes, etc. However, as these mechanisms may be of any standard and suitable construction, and form no part of the present invention, they are not shown or described.

While in the above construction the wheels 17 are shown as rotating members, it is apparent and contemplated that these members may be merely stationary and curved guides which still operate in the above-described manner to disconnect the film upon the presence of a defect. Also, the actuator arms 27 may be moved manually or their movement may be controlled by a solenoid or other suitable operating means, not shown, connected to shaft 34.

In view of the above description, it is believed apparent that the present invention provides a new, useful, and highly effective device for detecting edge tears or other defects in a moving film or web. The device is accurate and automatic. Furthermore, the device may be used for a wide variety of mechanisms which process or operate on a continuous web material.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. A device for detecting edge imperfections in a moving web, comprising, in combination, a support, a pair of detecting members mounted on said support and engaging the opposite edges of the moving web and spaced a distance less than the width of the web to flex the web laterally, and means on said members to move the web automatically out of contact with at least one of said members when an imperfection is moved into registry with said one member.

2. A device for detecting edge imperfections in a moving web, comprising, in combination, a support, a pair of curved guides mounted on said support and engaging the opposite edges of the moving web, means to press said guides against said edges to flex the web laterally, and means on said guides for camming the web automatically but of engaging relation with at least one of said guides when a web imperfection is moved into registry with said one guide.

3. A device for detecting edge imperfections in a moving web, comprising, in combination, a support, a pair of wheels mounted on said support and positioned adjacent opposite edges of the moving web, means to retain said members in yieldable engagement with said edges and tending to move said wheels toward each other and normal to the movement of said web to flex the web laterally, means on said wheels to guide the web thereon, and camming means on said wheels to cam the web out of engaging relation with at least one of said wheels when an imperfection is moved into registry with said one wheel.

4. A device for detecting edge imperfections in a moving web, comprising, in combination, a support, a pair of wheels mounted on said support and positioned adjacent the opposite edges of said web, guide means on said wheels to receive and guide the edges of said web, means to retain said guide means in yieldable engagement with said edges to flex the web laterally, and a section on each of said wheels to move an edge out of guiding relation with the guide means when an imperfection is moved into registry with one of said wheels.

5. A device for detecting edge imperfections in a moving web, comprising, in combination, a support, a pair of laterally aligned web guides movably mounted on said support and positioned a distance apart less than the width of said web, means tending to move said guides to said distance, means to separate said guides to position the latter to engage the edges of said web to tension and flex the latter transversely, and means on said guides to move the latter out of tensioning relation with said web when an imperfection moves into registry with one of said guides.

6. A device for detecting edge imperfections in a moving web, comprising, in combination, a support, a pair of laterally aligned web guides movably mounted on said support and positioned a distance apart less than the width of said web, means to move said guides laterally and into engagement with said web and to a position to flex said web transversely to tension the web laterally, and means on said guides to move the web out of engagement with said guides to permit the guides to return to said distance when an imperfection is moved into registry with one of said guides.

7. A device for detecting edge imperfections in a moving web, comprising, in combination, a support, a pair of laterally aligned web guides movably mounted on said support and positioned a distance apart less than the width of said web, means to move said guides laterally and into engagement with said web and at a position to flex said web transversely to tension the web laterally, means on said guides to move the web out of engagement with said guides to permit the guides to return to said distance when an imperfection is moved into registry with one of said guides, and means actuated by said guides when the latter return to said distance to indicate the presence of an imperfection in said web.

8. A device for detecting edge imperfections in a moving web, comprising, in combination, a support, a pair of grooved wheels, means to mount said wheels on said support a distance apart less than the width of said web, means tending to retain said wheels yieldably at said distance, said wheels being movable a greater distance apart but still less than the width of said web to engage the edges of the latter to flex said transversely to tension the web laterally so that said web supports said wheels at said greater distance, and surfaces on said wheels engageable with imperfections in the edges of said web to move the latter out of supporting relation with said wheels to permit the latter to return to said first distance to indicate the presence of an edge imperfection in said web.

9. A device for detecting edge imperfections in a moving web, comprising, in combination, a support, a pair of grooved wheels, means to mount said wheels on said support a distance apart less than the width of said web, means tending to retain said wheels yieldably at said distance, said wheels being movable a greater distance apart but still less than the width of said web to engage the edges of the latter to flex said web transversely to tension the web laterally so that said web supports said wheels at said greater distance, said web being movable out of supporting relation with said wheels when an imperfection is moved into registry with one of said wheels to permit the latter to return to said first distance, and electric switch means actuated by said wheels when the latter are returned to said first distance due to said imperfection.

10. A device for detecting edge imperfections in a moving web, comprising, in combination, a support, a pair of arms pivotally mounted at their lower ends on said support, web guides positioned on the upper ends of said arms, means connected to said arms to position said guides yieldably in contact with the opposite edges of said web to tension the latter transversely, and means on said guides to move an edge of said web out of engagement with a guide when an imperfection is moved into registry therewith.

11. A device for detecting edge imperfections in a moving web, comprising, in combination, a support, a pair of arms pivotally mounted at their lower ends on said support, web guides positioned on the upper ends of said arms, means connected to said arms to position said guides yieldably in contact with the opposite edges of said web to tension the latter transversely, means on said guides to move said web automatically out of contact with said guides when an edge imperfection is moved into registry with one of said guides, a switch, and means to move said arms to actuate said switch when said guides are out of contact with said web.

12. A device for detecting edge imperfections in a moving web, comprising, in combination, a support, a pair of connected arms rockably mounted on said support, a post pivoted at its lower end on each of said arms, a web edge guide positioned at the top of each post, said guides being arranged in lateral alignment and in position to engage the opposite edges of and to be positioned a definite distance apart by said web, means engaging said posts and tending to move said guides toward each other to retain said guides in engagement with said edges and to flex the web laterally, means on said guides to move the guides out of web engaging relation when an edge imperfection is moved into registry with one of said guides, said post engaging means serving to move said guides toward each other when disengaged from said web, a switch, and means on said arms for actuating said switch when said guides are moved toward each other.

13. A device for detecting edge imperfections in a moving web, comprising, in combination, a support, a pair of connected substantially parallel arms rockably mounted on said support, a post pivoted at its lower end on each of said arms, a web edge guide positioned at the top of each post, said guides being arranged in lateral alignment and in position to engage the opposite edges of and to be positioned a definite distance apart by said web, means to move said arms about said pivots to shift said posts and guides apart a distance greater than the width of said web to a loading position to permit the web to be positioned between said guides, means operative upon release of said arm moving means to rock said posts on said arms to move said guides toward each other to a position where the guides engage the edges of said web and are spaced apart a distance less than the width of said web to flex the latter transversely to tension the web laterally, means on said guides to move a web edge out of contact therewith when an imperfection is moved into registration with one of said guides, said post moving means then serving to rock said posts to shift said guides toward each other to position said guides a distance less than said first distance, and a switch actuated by said posts when said guides are moved to said last distance upon disengagement from said web.

References Cited in the file of this patent

UNITED STATES PATENTS

| | | |
|---|---|---|
| 1,480,845 | Vidaver | Jan. 15, 1924 |
| 2,469,608 | Phillimore | May 10, 1949 |
| 2,699,676 | Grunwald et al. | Jan. 18, 1955 |
| 2,779,549 | Teplitz | Jan. 29, 1957 |